United States Patent
Choi et al.

(10) Patent No.: US 9,025,685 B2
(45) Date of Patent: *May 5, 2015

(54) METHOD AND APPARATUS FOR SELECTING MODULATION AND CODING SCHEME (MCS) INDEX BASED ON FREQUENCY SELECTIVITY

(71) Applicant: LG Electronics Inc., Seoul (KR)

(72) Inventors: Jin Soo Choi, Anyang-si (KR); Min Seok Oh, Anyang-si (KR); Hyung Ho Park, Anyang-si (KR); Sung Ho Moon, Anyang-si (KR); Jae Hoon Chung, Anyang-si (KR); Doo Hyun Sung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,517

(22) Filed: Oct. 29, 2013

(65) Prior Publication Data

US 2014/0056260 A1    Feb. 27, 2014

Related U.S. Application Data

(63) Continuation of application No. 12/524,755, filed as application No. PCT/KR2008/000291 on Jan. 17, 2008, now Pat. No. 8,594,208.

(30) Foreign Application Priority Data

Jan. 30, 2007    (KR) .................. 10-2007-0009375

(51) Int. Cl.
*H04K 1/10*    (2006.01)
*H04W 72/04*    (2009.01)
(Continued)

(52) U.S. Cl.
CPC ......... *H04W 72/0413* (2013.01); *H04L 1/0003* (2013.01); *H04L 1/0009* (2013.01);
(Continued)

(58) Field of Classification Search
CPC . H04L 5/0007; H04L 27/2647; H04L 1/0618; H04W 28/04; H04W 72/04
See application file for complete search history.

(56) References Cited

U.S. PATENT DOCUMENTS 6,901,046 B2    5/2005    Hsu et al.
7,149,245 B2    12/2006    Budka et al.
(Continued)

FOREIGN PATENT DOCUMENTS

CN    1611028 A    4/2005
EP    1 024 622 A2    8/2000
(Continued)

OTHER PUBLICATIONS

Haleem et al., "Adaptive Stochastic Iterative Rate Selection for Wireless Channels", IEEE Communications Letters, vol. 8, No. 5, May 5, 2004.

(Continued)

*Primary Examiner* — Leon-Viet Nguyen
(74) *Attorney, Agent, or Firm* — Birch, Stewart, Kolasch & Birch, LLP

(57) ABSTRACT

A method of selecting a modulation and coding scheme (MCS) index in a wireless communication system is disclosed. More specifically, the method includes measuring a frequency selectivity of a receiving channel, selecting a MCS index having a coding rate below a prescribed coding rate threshold value if the measured frequency selectivity is greater than or equal to a specified frequency selectivity threshold, and selecting the MCS index having the coding rate above or equal to the prescribed coding rate threshold value if the measured frequency selectivity is less than the specified frequency selectivity threshold.

17 Claims, 7 Drawing Sheets

(51) Int. Cl.
  *H04L 1/00* (2006.01)
  *H04L 1/20* (2006.01)
  *H04L 25/02* (2006.01)
  *H04L 27/26* (2006.01)
  *H04W 24/10* (2009.01)
  *H04W 28/22* (2009.01)

(52) U.S. Cl.
  CPC ............. *H04L1/0016* (2013.01); *H04L 1/0021* (2013.01); *H04L 1/0025* (2013.01); *H04L 1/20* (2013.01); *H04L 25/0222* (2013.01); *H04L 27/2601* (2013.01); *H04W 24/10* (2013.01); *H04W 28/22* (2013.01)

(56) References Cited

U.S. PATENT DOCUMENTS

| | | | |
|---|---|---|---|
| 7,340,267 | B2 | 3/2008 | Budka et al. |
| 8,594,208 | B2 * | 11/2013 | Choi et al. ............ 375/260 |
| 2003/0086371 | A1 | 5/2003 | Walton et al. |
| 2003/0202574 | A1 | 10/2003 | Budka et al. |
| 2005/0270978 | A1 | 12/2005 | Haines |
| 2006/0008020 | A1 | 1/2006 | Blankenship et al. |
| 2006/0034383 | A1 | 2/2006 | Su et al. |
| 2006/0209669 | A1 | 9/2006 | Nishio |
| 2006/0233280 | A1 | 10/2006 | Tynderfeldt et al. |
| 2007/0121738 | A1 * | 5/2007 | Yoshii et al. ............ 375/260 |
| 2007/0153833 | A1 | 7/2007 | Chang et al. |
| 2007/0206695 | A1 | 9/2007 | Ye et al. |
| 2008/0298482 | A1 | 12/2008 | Rensburg et al. |
| 2012/0155519 | A1 * | 6/2012 | Futagi et al. ............ 375/219 |

FOREIGN PATENT DOCUMENTS

| | | |
|---|---|---|
| EP | 1 571 795 A2 | 9/2005 |
| JP | 2001268148 A | 9/2001 |
| JP | 2004166123 A | 6/2004 |
| JP | 2006030867 A | 2/2006 |
| JP | 2006059565 A | 3/2006 |
| KR | 10-2004-0013463 A | 2/2004 |
| KR | 10-2004-0056976 A | 7/2004 |
| KR | 10-2004-0092915 A | 11/2004 |
| KR | 10-2005-0005993 A | 1/2005 |
| KR | 10-2008-0071314 A | 8/2008 |
| WO | WO 2004/017554 A1 | 2/2004 |
| WO | WO 2006/083139 A1 | 8/2006 |

OTHER PUBLICATIONS

Samsung: "Link Adaptation Considerations for Evolved UTRA Downlink and Text Proposal", 3GPP DRAFT; R1-060346, Feb. 13-17, 2006, XP050101293.

Talukdar et al., "Agressive Modulation/Coding Scheme Selection for Maximizing System Throughput in a Multi-Carrier System", IEEE, 2005, Motorola Labs—Schaumburg, IL, USA.

* cited by examiner

METHOD AND APPARATUS FOR SELECTING MODULATION AND CODING SCHEME (MCS) INDEX BASED ON FREQUENCY SELECTIVITY

CROSS-REFERENCE TO RELATED APPLICATIONS

This application is a Continuation of co-pending application Ser. No. 12/524,755 filed on Jul. 28, 2009, which is the national phase of PCT International Application No. PCT/KR2008/000291 filed on Jan. 17, 2008, and which claims priority to Application No. 10-2007-0009375 filed in the Republic of Korea on Jan. 30, 2007. The entire contents of all of the above applications are hereby incorporated by reference. The present application relates to U.S. patent application Ser. No. 12/510,988, now U.S. Pat. No. 7,848,252, which is a Continuation of U.S. patent application Ser. No. 12/524,755.

TECHNICAL FIELD

The present invention relates to method for selecting modulation and coding scheme (MCS) index, and more particularly, to method and apparatus for selecting MCS index based on frequency selectivity.

BACKGROUND ART

A next generation mobile wireless communication system generally provides a high speed multimedia service. With the use of multimedia service becoming more widespread, wireless communication users' demand and need for faster, more reliable, and better multimedia is growing.

To accommodate such a growing demand, research to provide more efficient and improved service is taking place. In other words, various methods of improving data transmission are being researched, and in particular, ways to improve use of frequency resources are being explored.

With fast growing use and popularity of multimedia and communication services, demand for faster and more reliable wireless communication services is also increasing at a fast rate. In order to accommodate such changing demands, the capacity of the wireless communication system needs to improve as well. To this end, the capacity can be improved by better utilizing and increasing the efficiency of the existing limited wireless resources.

DISCLOSURE OF THE INVENTION

Accordingly, the present invention is directed to method and apparatus for selecting MCS index based on frequency selectivity that substantially obviates one or more problems due to limitations and disadvantages of the related art.

An object of the present invention is to provide a method of selecting a modulation and coding scheme (MCS) index in a wireless communication system.

Another object of the present invention is to provide a method of selecting a modulation and coding scheme (MCS) index from a predetermined MCS set, having same frequency efficiency, in a wireless communication system.

A further object of the present invention is to provide a method of selecting a modulation and coding scheme (MCS) index in a wireless communication system having a first MCS table associated with coding rate that is less than a specified coding rate threshold and a second MCS table associated with coding rate that is greater than or equal to the specified coding rate threshold.

Yet, in another object of the present invention is to provide an apparatus for selecting a modulation and coding scheme (MCS) index in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of selecting a modulation and coding scheme (MCS) index in a wireless communication system includes measuring a frequency selectivity of a receiving channel, selecting a MCS index having a coding rate below a prescribed coding rate threshold value if the measured frequency selectivity is greater than or equal to a specified frequency selectivity threshold, and selecting the MCS index having the coding rate above or equal to the prescribed coding rate threshold value if the measured frequency selectivity is less than the specified frequency selectivity threshold.

In another aspect of the present invention, a method of selecting a modulation and coding scheme (MCS) index from a predetermined MCS set, having same frequency efficiency, in a wireless communication system includes measuring a signal to noise ratio (SNR) of a receiving signal, measuring a frequency selectivity of a receiving channel if a first MCS index is of the MCS set, wherein the first MCS index is determined by comparing the measured SNR against a prescribed SNR threshold, selecting a second MCS index having a coding rate below a predetermined coding rate threshold if the measured frequency selectivity is greater than or equal to a specified frequency selectivity threshold, and selecting the second MCS index having the coding rate greater than or equal to the predetermined coding rate threshold if the selected frequency selectivity is less than the specified frequency selectivity threshold, wherein the second MCS index is of the MCS set.

In a further aspect of the present invention, a method of selecting a modulation and coding scheme (MCS) index in a wireless communication system having a first MCS table associated with coding rate that is less than a specified coding rate threshold and a second MCS table associated with coding rate that is greater than or equal to the specified coding rate threshold includes measuring a frequency selectivity of a receiving channel, selecting a MCS index from the first MCS table if the measured frequency selectivity is greater than or equal to a specified frequency selectivity threshold, and selecting the MCS index from the second MCS table if the measured frequency selectivity is less than the specified frequency selectivity threshold.

Yet, in another aspect of the present invention, an apparatus for selecting a modulation and coding scheme (MCS) index in a wireless communication system includes a frequency selectivity measurement module configured to measure a frequency selectivity of a receiving channel, and a MCS index selection module configured to: select a MCS index having a coding rate below a prescribed coding rate threshold value if the measured frequency selectivity is greater than or equal to a specified frequency selectivity threshold, and select the MCS index having the coding rate above or equal to the prescribed coding rate threshold value if the measured frequency selectivity is less than the specified frequency selectivity threshold.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
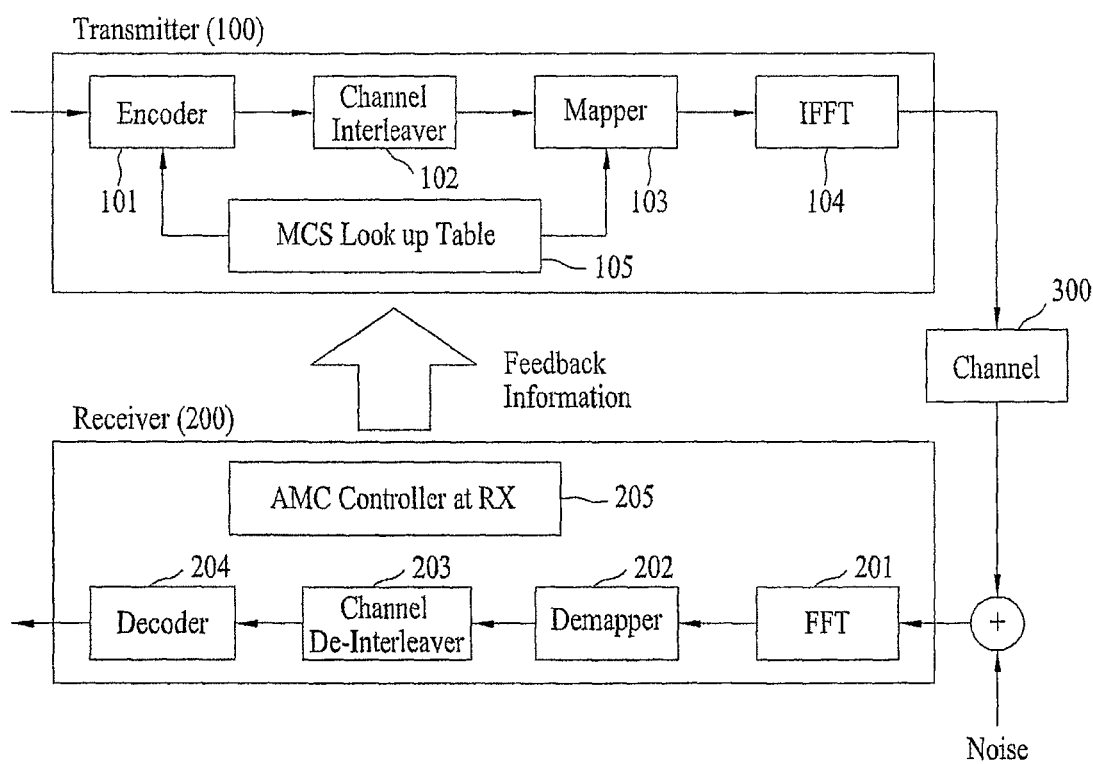
FIG. 1 is an exemplary diagram illustrating a structure of an orthogonal frequency division multiplexing (OFDM) communication system to which an adaptive modulation and coding (AMC) scheme is applied.

FIG. 1 is an exemplary diagram illustrating a structure of an orthogonal frequency division multiplexing (OFDM) communication system to which an adaptive modulation and coding (AMC) scheme is applied. Referring to FIG. 1, a transmitting end 100 of the OFDM system comprises an encoder 100, a channel interleaver 201, a mapper 103, an inverse fast Fourier transform (IFFT) module 104, and a modulation and coding scheme (MCS) look-up table 105 for application of the AMC scheme.

More specifically, the encoder 101 can be configured to reduce the effects of coding data bits and/or effects of noise. The channel interleaver 102 can be configured to shuffle the coded bits so that burst error of a channel can be distributed. In addition, the mapper 103 can be configured to convert the bits outputted from the channel interleaver 102 into symbols. Subsequently, the IFFT module 104 can be configured to modulate the symbols into OFDM symbols and sends them via channel 300.

In addition, the transmitting end 100 can use the MCS look-up table 105, which is based on feedback information (e.g., MCS index) received from a receiving end 200. That is, the transmitting end 100 can select a modulation rate and a coding rate corresponding to the MCS index which corresponds to (or is provided in) the MCS look-up table 105. The selected modulation rate and the coding rate can then be used for operations of the encoder 101 and the mapper 103, respectively.

Referring to FIG. 1, the receiving end 200 of the OFDM communication system comprises a fast Fourier transform (FFT) module 201, a demaper 202, a channel de-interleaver 203, a decoder 204, and an AMC controller 205. More specifically, the FFT module 201 can be configured to convert the OFDM symbols, which were converted by the IFFT module 104, back to symbols, and the de-mapper 202 can be configured to convert the symbols into bits. Thereafter, the de-interleaver 203 can be configured to arranges (or re-orders) the shuffled bits back to original arrangement or order. Moreover, the channel decoder 204 can be configured to output the processed (or estimated) data bits.

In addition, the AMC controller 205 can be configured to calculate a signal-to-noise ratio (SNR) of the received signal(s) and include this information in the feedback information, which is to be used for MCS index, for example, and thereafter, transmitted to the transmitting end.

Figure 2:
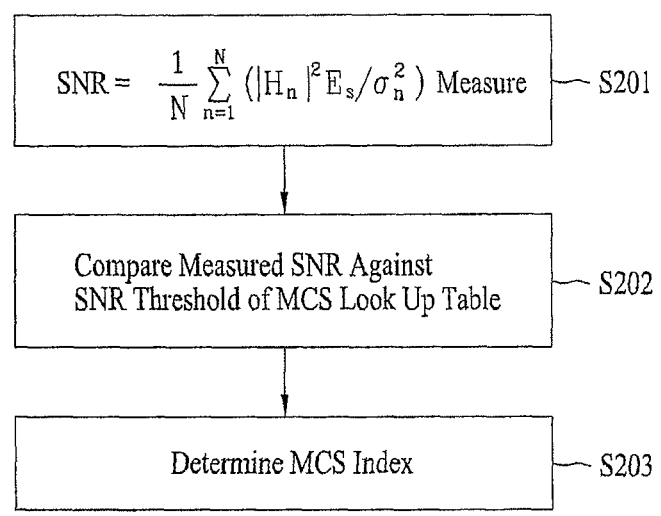
FIG. 2 is an exemplary diagram illustrating application of the AMC scheme in the OFDM system.

FIG. 2 is an exemplary diagram illustrating application of the AMC scheme in the OFDM system. Referring to FIG. 2, the AMC scheme can measure average SNRs for all subcarriers in the receiving end. Thereafter, a code rate (or coding rate) and/or modulation size for optimizing transmission rate of the data can be determined and selected. Here, the selection can be guided or restricted by a prescribed level of quality of service (QoS). Then, the MCS index corresponding to the selected coding rate and/or modulation size can be selected and only the MCS index can be transmitted to the transmitting end.

More specifically, the receiving end 200 uses the feedback information or channel responses to calculate the average SNR of all the subcarriers (S201). Here, the SNR can be calculated according to a following equation.

$$SNR = \frac{1}{N}\sum_{n=1}^{N}(|H_n|^2 E_S / \sigma_n^2) \quad \text{[Equation 1]}$$

Referring to Equation 1, N denotes a total number of subcarriers, $H_n$ denotes $n^{th}$ subcarrier of the channel response, $E_S$ denotes an average signal energy, and $\sigma_n^2$, denotes noise energy.

In subsequent steps (S202 and S203), the measured SNR from S201 can be used to select (or determine) the MCS index, which represents the optimized data rate, in view of a predetermined frame error rate (FER). More specifically, in S202, the measured SNR is compared with a SNR threshold for each level of link curve table included in the MCS look-up table 105. The MCS look-up table 105 includes the link curve table which represents the SNR threshold that satisfies the predetermined FER level. The SNR threshold can be determined by using simulation results according to all modulation sizes and coding rates used by the OFDM system. There can be various types of MCS look-up table, and the following tables represent an example of a MCS look-up table.

TABLE 1

| Level | Modulation | Coding rate |
| --- | --- | --- |
| 1 | QPSK | 1/3 |
| 2 | QPSK | 1/2 |
| 3 | QPSK | 2/3 |
| 4 | QPSK | 3/4 |
| 5 | 16QAM | 1/3 |
| 6 | 16QAM | 1/2 |
| 7 | 16QAM | 2/3 |
| 8 | 16QAM | 3/4 |
| 9 | 64QAM | 1/3 |
| 10 | 64QAM | 1/2 |
| 11 | 64QAM | 2/3 |
| 12 | 64QAM | 3/4 |

TABLE 2

| Level | Modulation | Coding rate |
| --- | --- | --- |
| 1 | QPSK | 1/3 |
| 2 | QPSK | 5/12 |
| 3 | QPSK | 1/2 |
| 4 | QPSK | 2/3 |
| 5 | QPSK | 3/4 |
| 6 | QPSK | 5/6 |
| 7 | 16QAM | 1/3 |
| 8 | 16QAM | 5/12 |
| 9 | 16QAM | 1/2 |
| 10 | 16QAM | 2/3 |
| 11 | 16QAM | 3/4 |
| 12 | 16QAM | 5/6 |
| 13 | 64QAM | 1/3 |
| 14 | 64QAM | 5/12 |
| 15 | 64QAM | 1/2 |
| 16 | 64QAM | 2/3 |
| 17 | 64QAM | 3/4 |
| 18 | 64QAM | 5/6 |

As discussed, Tables 1 and 2 are examples of MCS look-up tables. Here, indication of a link curve table having SNR threshold corresponding to each MCS index is not shown. In step S202, the link curve table of the MCS look-up table can be used to determine a maximum level SNR threshold which satisfies the SNR measured in step S201.

Thereafter, in step S203, the measured SNR can be used in selection of the MCS index, which indicates a maximum SNR threshold from the link curve table, from the MCS look-up table. The MCS index can then be transmitted to the transmitting end 100 as feedback information.

After receiving the feedback information from the receiving end 200, the transmitting end 100 can use the MCS index (also referred to as "MCS level index") to determine the modulation rate and the coding rate to be used for data transmission. In other words, the MCS look-up table can be used to determine the modulation rate and the coding rate to be used for data transmission. Generally, the determined modulation rate and the coding rate are also applied uniformly to all the subcarriers.

As described, only the SNR is considered in determining the MCS index and as such, other factors such as frequency selectivity of a channel is not considered. It may be more effective and efficient to apply different/various coding rates according to a level (or a degree) of frequency selectivity of a channel.

Figure 3:
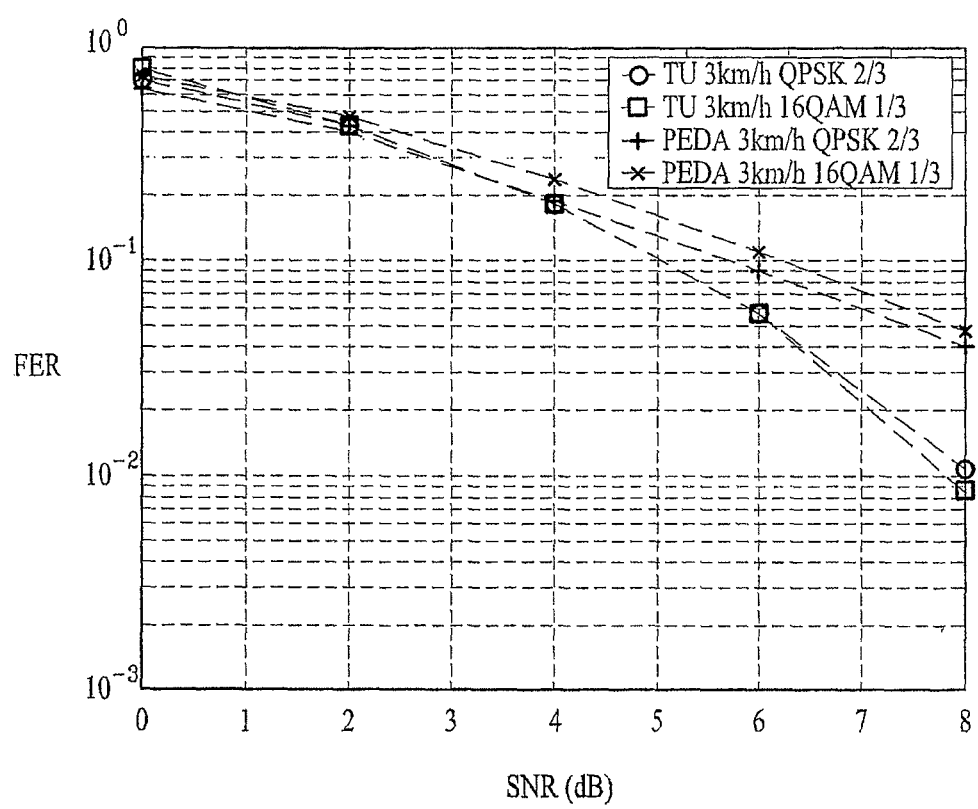
FIG. 3 is an exemplary graph illustrating performance comparisons according to modulation and coding scheme (MCS) in a channel environment having different frequency selectivity.
Figure 4:
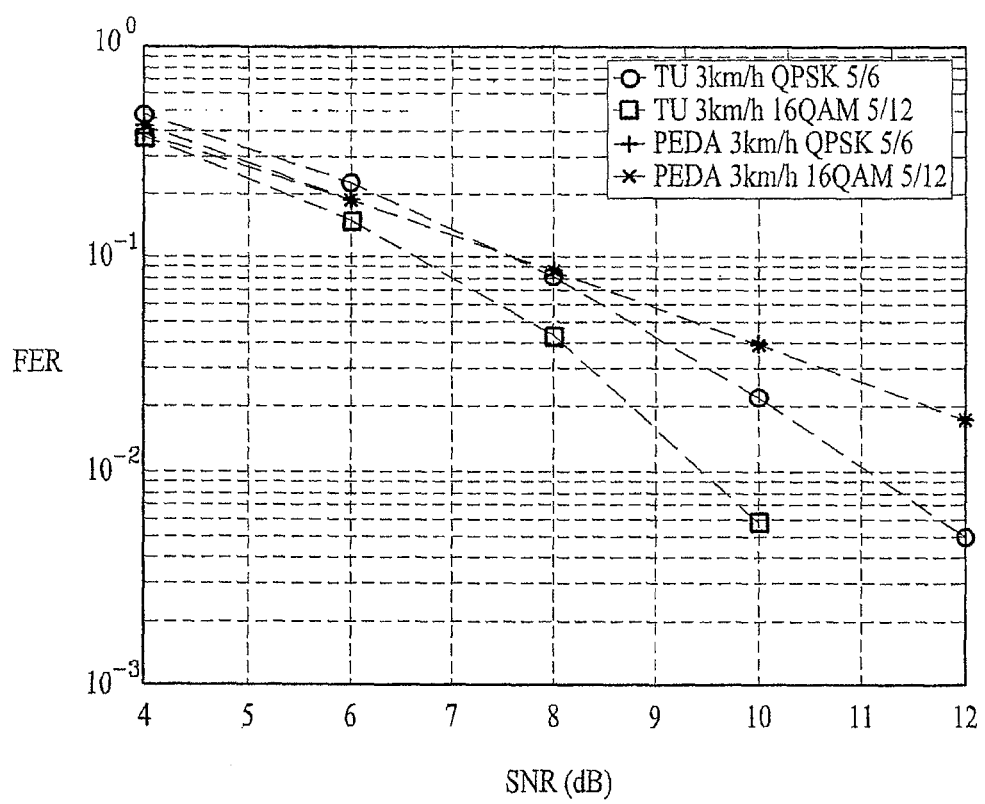
FIG. 4 is another exemplary graph illustrating performance comparisons according to modulation and coding scheme (MCS) in a channel environment having different frequency selectivity.

FIG. 3 and FIG. 4 are exemplary graphs illustrating performance comparisons according to modulation and coding scheme (MCS) in a channel environment having different frequency selectivity.

Referring to FIGS. 3 and 4, the performance results of the OFDM system applying two (2) MCS index (or MCS level index) having the same spectral efficiency are shown. Here, TU stands for "typical urban" and represents a channel environment having a relatively larger frequency selectivity. PEDA stands for "Pedestrian A" and represents a channel environment having a relatively smaller frequency selectivity. For both, a comparatively slow moving speed of 3 km/h is assumed, and there are two (2) receiving antennas to achieve antenna diversity. Based on these settings and assumption(s), simulations were conducted, and the results are shown in these figures.

As shown in FIG. 3, the two (2) MCS indices have the same frequency efficiency where a first is represented by a quadrature phase shift keying (QPSK) with 2/3 coding rate applied thereto, and a second is represented by a 16 quadrature amplitude modulation (16QAM) with 1/3 coding rate applied thereto. In a channel environment where the frequency selectivity is smaller (e.g., PEDA), the FER performance (or FER results) of a situation where low modulation rate and high coding rate (e.g., QPSK, 2/3 coding rate) were applied outperformed another situation where high modulation rate and low coding rate (16QAM, 1/3 coding rate) were applied.

Alternatively, in a channel environment where the frequency selectivity is larger (e.g., TU), the FER performance (or FER results) of a situation where high modulation rate and low coding rate (e.g., 16QAM, 1/3 coding rate) were applied outperformed another situation where low modulation rate and high coding rate (e.g., QPSK, 1/3 coding rate) were applied.

If the frequency selectivity is small, gain achieved from channel coding in the OFDM system is relatively small, and conversely, if the frequency selectivity is large, gain achieved from channel coding in the OFDM system is relatively greater. More specifically, the performance (or results) of channel coding depends on amount or level of compensation of the subcarriers experiencing deep fading from performing channel coding in the OFDM system. Here, frequency diversity gained from channel coding is directly proportional to the size of frequency selectivity. In other words, if the frequency selectivity is large, then the frequency diversity gained from channel coding also increases. Consequently, it is advantageous to apply strong channel coding (or low coding rate). Conversely, if the frequency diversity is small (e.g., small frequency selectivity), it is more advantageous to transmit using high coding rate since the gain that can be achieved from channel coding is relatively smaller.

Referring to FIG. 4, the two (2) MCS indices have the same frequency efficiency where a first is represented by QPSK with 5/6 coding rate applied thereto, and a second is represented by 16QAM with 5/12 coding rate applied thereto. In the channel environment having high frequency selectivity (e.g., TU), the FER performance (or FER results) is better in a situation where a comparatively lower coding rate (e.g., 16QAM, 5/12 coding rate) is applied than a situation where a comparatively larger coding rate (e.g., QPSK, 5/6 coding rate) is applied. Furthermore, compared to FIG. 3, the performance is superior to that of FIG. 3 as a result of the difference in the coding rate (e.g., QPSK, 5/6 coding rate versus 16QAM, 5/12 coding rate). With respect to FIG. 3, the performance is nearly saturated because strong channel coding is applied. However, a relatively weaker channel coding is applied, and therefore, there is greater difference in the frequency diversity gain can be achieved in FIG. 4 where relatively weaker channel coding is applied compared to that of FIG. 3.

In FIGS. 3 and 4, the simulation results were based on two (2) receiving antennas. If the simulations were run on a single receiving antenna, the difference would likely have been greater. Furthermore, if the channel environment was different (e.g., channel having higher frequency selectivity or channel having lower frequency selectivity), the performance difference would have been noticeably different.

As discussed, the performance of the system can vary according to the channel environment, and therefore, it is important to consider different and/or varying channel conditions. Without such considerations, the use of a fixed MCS index and application of the AMC scheme thereto would likely result in less-than-optimum system performance.

Figure 5:
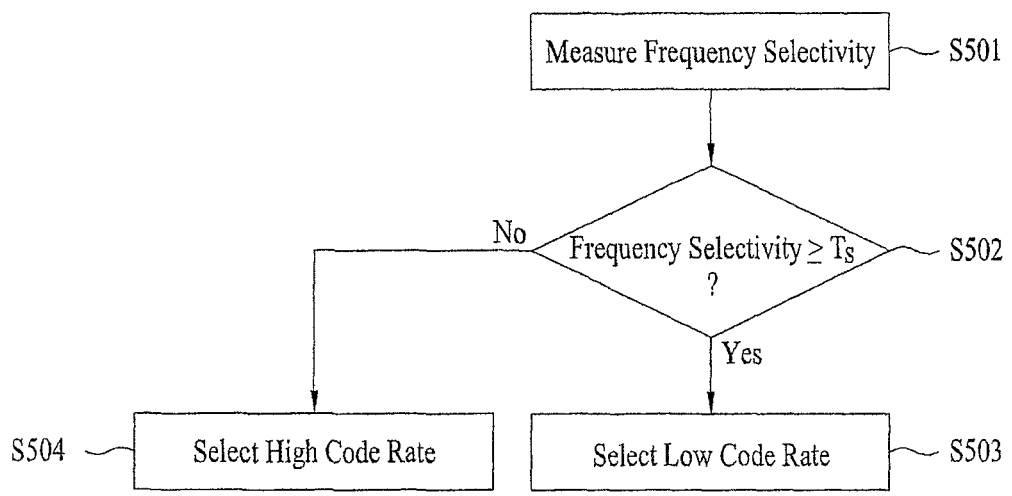
FIG. 5 is an exemplary diagram illustrating selection of coding rate according to frequency selectivity.

FIG. 5 is an exemplary diagram illustrating selection of coding rate according to frequency selectivity. Referring to FIG. 5, the frequency selectivity of the receiving channel can be measured (S501). Various methods can be used for measuring the frequency selectivity of the receiving channel, and in this example, the frequency selectivity of the receiving channel is measured using multi-path delay profile and coherence bandwidth.

For example, if the multi-path delay is large, the coherence bandwidth is small. Moreover, if the multi-path delay is greater than a specified threshold or if the coherence bandwidth is below a specified threshold, the frequency selectivity of the receiving channel can be determined to be high (e.g., high frequency selectivity).

Further, in order to measure the frequency selectivity of the channel, a correlator can be used to measure a level (or degree) of correlation between each subcarrier. The correlator can be used when it is difficult to measure the multi-path delay value or the coherence bandwidth value. At the same time, the correlator can be used to measure the level or degree of correlation between each OFDM subcarrier and determine the frequency selectivity of the channel. The following equation can be used to measure the level or degree of correlation between the OFDM subcarriers.

$$\sigma = \frac{1}{N}\sum_{n=1}^{N-m} h_n h_{n+m}^* \quad \text{[Equation 2]}$$

Here, σ denotes the correlation value between each subcarriers, N denotes a total number of subcarriers, n and m denote subcarrier index, and $h_n$ denotes channel response of nth subcarrier.

After calculating the correlation value by using an equation such as the one of Equation 2, the correlation value can be compared to a specified threshold value. If the calculated correlation value is greater than (or equal to) the specified threshold value, the frequency selectivity of the channel can be determined to be high, and conversely, if the calculated correlation value is smaller than the specified threshold value, the frequency selectivity of the channel can be determined to be low. Here, the channel response being used can be calculated using pilot symbols and/or preamble which are transmitted simultaneously during data transmission.

In another embodiment of the present invention, a degree of power correlation between each subcarrier channels can be used to measure the frequency selectivity of the channel. Here, if the frequency selectivity of the receiving channel is large, the degree of correlation between the subcarrier channels is correspondingly large. Using this principle, it is possible to estimate the degree (or amount) of power correlation between each subcarrier channels for the frequency selectivity. The correlator can be estimated using the following equation.

$$w_1\left(\left|\frac{|h_m|^2 - |h_1|^2}{m-1}\right|\right) + w_2\left(\left|\frac{|h_{m+1}|^2 - |h_2|^2}{m-1}\right|\right) + \quad \text{[Equation 3]}$$
$$w_3\left|\frac{|h_{m+2}|^2 - |h_3|^2}{m-1}\right| + \ldots + W_{N-m+1}\left|\frac{|h_N|^2 - |h_{N+m+1}|^2}{m-1}\right|$$

Referring to Equation 3, the subscripts represent the subcarrier index, and the sum of $W_1$-$W_{N-m+1}$ equals 1. Using this equation, the correlation value can be attained. If the attained correlation value is greater than (or equal to) a specified threshold value, the frequency selectivity of the channel is determined to be large. Conversely, if the attained correlation value is less than the specified threshold value, then the frequency selectivity of the channel is determined to be small.

Furthermore, as another embodiment of the present invention, a power distribution value between each subcarrier index can be used to measure the frequency selectivity of the channel. If the frequency selectivity of the receiving channel is large, the power distribution of each subcarrier of the corresponding channel is also large and using this power distribution, the frequency selectivity can be estimated or measured. The power distribution value of each subcarriers can be measured using the following equation.

$$E[(|h_n|^2 - M)^2] = \quad \text{[Equation 4]}$$
$$\frac{(|h_1|^2 - M)^2}{N} + \frac{(|h_2|^2 - M)^2}{N} + \ldots + \frac{(|h_N|^2 - M)^2}{N}$$

Referring to Equation 4, M denotes the average value of the channel power, N denotes the total number of subcarriers, and $h_n$ denotes the channel response of the $n^{th}$ subcarrier.

As discussed, measuring of the frequency selectivity of the channel is not limited to the discussions of above and can be applied or implemented using other means and methods.

Referring to FIG. 5, after determining the frequency selectivity of the receiving channel (S501), a determination is made as to whether the degree (or level) of the frequency selectivity is greater than or equal to than a specified frequency selectivity threshold ($T_s$) (S502). Here, the specified frequency selectivity threshold ($T_s$) can be determined differently according to a method (or a scheme) for measuring the frequency selectivity. In a case where the frequency selectivity is measured using a specified method (or scheme), the performance difference between the MCS levels according to the frequency selectivity of the channel, as illustrated in FIGS. 3 and 4, may vary or be different based on which modulation rate or coding rate is applied. As such, the specified frequency selectivity threshold ($T_s$) can be modified according to each of different situations.

According to this embodiment, if the frequency selectivity of the channel of S502 is determined to be greater than (or equal to) the predetermined specified frequency selectivity threshold ($T_s$), a low coding rate can be selected (S503). The low coding rate is selected so as to apply the AMC scheme. Alternatively, if the frequency selectivity of the channel of S502 is determined to be less than the predetermined specified frequency selectivity threshold ($T_s$), a high coding rate can be selected (S504). Here, the high coding rate is selected so as to apply the AMC scheme.

In S503 and S504, selecting of the low coding rate or the high coding rate relates to the predetermined MCS look-up table. That is, the coding rate and modulation rate having the same frequency efficiency from the MCS look-up table can be selected. Furthermore, the MCS index having a low coding rate and a high modulation rate or the MCS index having a high coding rate and a low modulation rate can be selected. However, the system may demand higher overall throughput over a good FER. In such as case, instead of using the predetermined MCS index set, the MCS level selection can be optimized so as to increase system throughput.

Hereafter, a more detailed description of the MCS index set, as it relates to predetermining the set, will be discussed. As discussed, the MCS index set includes MCS indices that have the same frequency efficiency within the MCS look-up table.

As described with respect to Table 1 and Table 2, the MCS look-up table can include the MCS level set having the same frequency efficiency. For example, the MCS level set 3 of Table 1 having index of QPSK, ⅔ coding rate has the same frequency efficiency as the MCS level set 5 of Table 1 having index of 16QAM, ⅓ coding rate. Furthermore, the MCS level set 6 of Table 1 having index of 16QAM, ½ coding rate has the same frequency efficiency as the MCS level set 9 having index of 64QAM, ⅓ coding rate.

In a discussion of another embodiment to follow, the MCS set (or the MCS level set) can be referred to as the MCS index set. Here, from a plurality of MCS level indices, the MCS set represented by two (2) MCS level indices having acceptable coding rate can be selected. The two (2) MCS level indices have the same frequency efficiency based on the degree (or level) of frequency selectivity. Accordingly, the MCS index set defined by Tables 1 and 2 can be expressed as follows, respectively.

TABLE 3

| Level | Modulation/Coding rate | |
|---|---|---|
| 1 | QPSK ⅔ | 16QAM ⅓ |
| 2 | 16QAM ½ | 64QAM ⅓ |

TABLE 4

| Level | Modulation/Coding rate | |
|---|---|---|
| 1 | QPSK ⅔ | 16QAM ⅓ |
| 2 | QPSK ⅚ | 64QAM 5/12 |
| 3 | 16QAM ¾ | 64QAM ½ |

Figure 6:
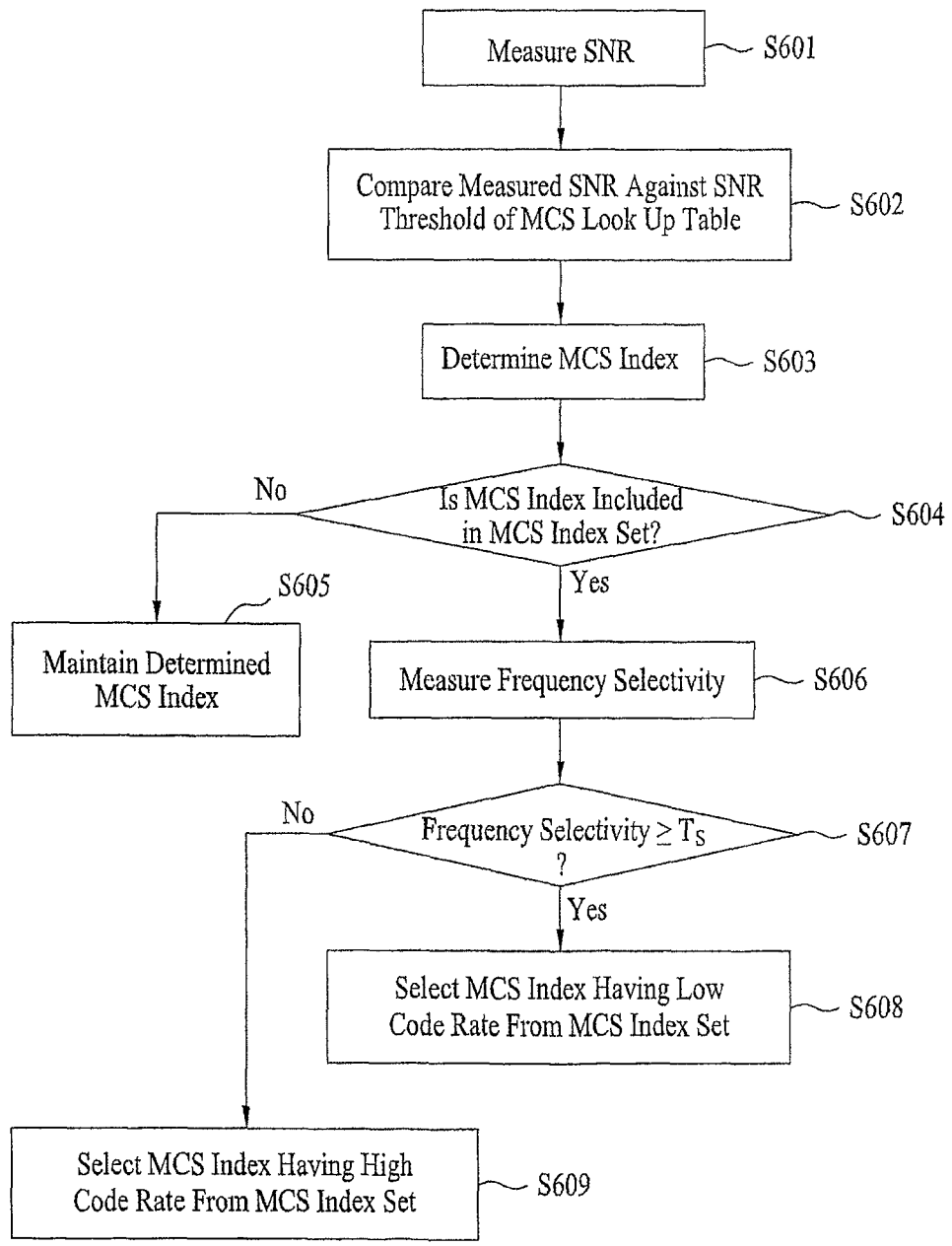
FIG. 6 is an exemplary diagram illustrating processes associated with MCS index selection.

FIG. 6 is an exemplary diagram illustrating processes associated with MCS index selection. More specifically, the processes are associated with selection of MCS index having the coding rate based on the frequency selectivity within a prescribed MCS set. Here, the prescribed MCS set includes the MCS indices, based on the SNR of the receiving signal, that have the same frequency efficiencies.

Referring to FIG. 6, the AMC controller of the receiving end can be configured to measure the SNR of the receiving signal (S601). The measured SNR can be compared to each SNR threshold values of the MCS look-up table (S602). Based on the comparison, the MCS level index can be determined when the AMC scheme is used (S603).

Thereafter, a determination can be made as to whether the determined MCS level index includes a predetermined MCS index set (S604). If the predetermined MCS index set is included in the MCS level index, a MCS set can be selected based on frequency selectivity of the receiving channel (S606). For example, if the existing MCS look-up table is the same as that of Table 1 and the determined MCS level index from S603 is 3 (QPSK, ⅔ coding rate), since this is within the range of the predetermined MCS index set, MCS index can be selected according to the frequency selectivity with respect to the predetermined MCS index set. In S606, the frequency selectivity of the receiving channel can be measured.

However, if the predetermined MCS index set is not included in the MCS level index, the MCS index determined in S603 can be maintained (S605), and if necessary, the determined MCS index can be transmitted to the transmitting end.

As discussed, the frequency selectivity of the receiving channel can be measured in S606. As a method of measuring frequency selectivity of the receiving channel, any one or more of following factors or elements can be used. The factors or elements include a multi-path delay profile according to receiving channel condition, coherence bandwidth, degree (or level) of correlation between each set of subcarriers of the receiving channel, power correlation, and power distribution value. However, the method of measuring frequency selectivity of the receiving channel is not limited to using the aforementioned factors or elements but can use other factors or elements.

In the subsequent step, a comparison is made to determine whether the frequency selectivity of the receiving channel measured in S606 is greater than (or equal to) a specified frequency selectivity threshold (S607). If the measured frequency selectivity of the receiving channel is greater than (or equal to) the specified frequency selectivity threshold ($T_s$), the MCS index having a low coding rate from the MCS index set can be selected (S608). Conversely, if the measured frequency selectivity of the receiving channel is smaller than the specified frequency selectivity threshold ($T_s$), the MCS index having a high coding rate from the MCS index set can be selected (S609).

For example, assume that Table 1 is used as the MCS look-up table, Table 3 is used as the MCS index set, and MCS level index 3 (QPSK, ⅔ coding rate) is selected. Here, if the frequency selectivity of the corresponding receiving channel is determined to be high, the MCS set having a low coding rate (16QAM, ⅓ coding rate) from the MCS index set of Table 3 with the same frequency efficiency is selected. If necessary, a corresponding MCS index (level 5) can be transmitted to the transmitting end. Further with the example, if level 5 index (16QAM, ⅓ coding rate) is selected and the frequency selectivity of the corresponding receiving channel is determined to be high, this means that the MCS index, from the MCS index set, having low coding rate is selected, and hence, the determined MCS index can be maintained.

The discussion of above assumes that both the transmitting end and the receiving end has information related to the MCS index set, and at the same time, assumes that both the transmitting end and the receiving end have the specified MCS index set stored.

According to an embodiment of the present invention, the receiving end can send to the transmitting end an unmodified MCS index based on SNR measurement of the receiving signal, or the receiving end can sent a modified MCS index in view of the frequency selectivity of the receiving channel. After receiving the MCS index from the receiving end, the transmitting end can determine the coding rate and the modulation rate in the encoder 101 and the mapper 103 of FIG. 1.

Preferably, the MCS index can be selected at the receiving end for acquiring necessary information. However, if the processes associated with MCS index selection, in addition to other processes and operations, take place at the receiving end, this can cause complexity problems for the receiving end.

In order to alleviate problems that can arise from receiving end performing the MCS index selection, for example, the transmitting end (e.g., base station or Node B) can be assigned to perform a part of the processes associated with the MCS index selection. More specifically, the process of measuring the frequency selectivity of the receiving channel can be performed at the receiving end, and information regarding the measured frequency selectivity is then sent to the transmitting end. With this information, the transmitting end can select the MCS index according to the received information which includes the frequency selectivity of the receiving channel. Here, with respect to FIG. 6, the information can further include not only the frequency selectivity of the receiving channel but also the SNR of the receiving signal.

Such a process can be used in a closed-loop system in which the information regarding the frequency selectivity of the receiving channel is fed back to the transmitting end. In the transmitting end, the MCS index selection module can operate using the information, including the MCS level and the frequency selectivity of the receiving channel, received from the receiving end. Here, the MCS selection processes can be the same as the processes described above with respect to embodiments of the present invention.

Because the information regarding the frequency selectivity of the receiving channel has to be fed back (or transmitted) to the transmitting end, there can be overload or excessive transmission of feedback information (which can also be referred to as feedback signaling overhead). As such, if the system deems the overload of the feedback information to be more important than the complexity problem of the receiving end, then it may be preferable to use the MCS index selection module of the transmitting end. However, if the system deems the overload of the feedback information to be less important than the complexity problem of the receiving end, then it may be preferable to use the MCS index selection module of the receiving end.

By using the principal where higher performance is achieved by applying weak channel coding (or high coding rate) in the PEDA environment, and by applying strong channel coding (or low coding rate) in the TU environment, an optimum performance can be achieved. Here, the MCS table is also used according to the frequency selectivity of the receiving channel.

In other words, a MCS table can apply the MCS level to which a low coding rate is applied (hereafter referred to as "$1^{st}$ MCS table"). Another MCS table can apply the MCS level to which a high coding rate is applied (hereafter referred to as "$2^{nd}$ MCS table"). With respect to the modulation rate, the $1^{st}$ MCS table can be configured with high modulation rate, and the $2^{nd}$ MCS table can be configured with low modulation rate.

The MCS index selection scheme can be applied in multiple antenna systems, such as a multi-input, multi-output (MIMO) system. Assuming that each of the embodiments as discussed belongs to the MIMO system, the frequency selectivity can be measured per channel according to each of the multiple antennas in steps S501 of FIG. 5 and S606 of FIG. 6. After frequency selectivity is measured per channel for each antenna, the MCS index can be re-selected for the channel having high frequency selectivity so that the particular channel can be assigned low coding rate. Conversely, if the channel has low frequency selectivity, then the MCS can be re-selected so that the particular channel can be assigned high coding rate. With such processes, the MIMO system can be optimized.

Here, the amount of calculations or measurements by the frequency selectivity measurement module and/or the MCS re-selection module can increase based on the number of transmit/receiving antennas. As such, the amount of calculations/measurement can be compared with performance enhancement in making the correct or appropriate selection.

If the MCS index selection scheme is applied in the MIMO system, the MCS level, having considered the frequency selectivity of the receiving channel per transmit antenna, can be applied for transmission. With multiple transmit antennas, diversity effect or gain can be optimized.

According to another embodiment of the present invention, the MCS index selection scheme can be applied to a situation where a single MCS index, including information regarding average of all orthogonal frequency division multiplexing (OFDM) subcarriers, is fed back to the transmitting end. Here, the situations can further include selecting MCS indices associated with each subcarrier or a group of subcarriers. In the frequency selectivity measurement steps, such as S501 of FIG. 5 and S606 of FIG. 6, the frequency selectivity can be measured per subcarrier or per a group of subcarriers. Here, the group of subcarriers includes at least two subcarriers per group. Furthermore, the frequency MCS index selection steps of FIGS. 5 and 6 can also select the MCS index for each subcarrier or for a group of subcarriers.

Here, the amount of information of the MCS indices can increase since MCS index is applied to each subcarrier or a group of subcarriers. In view of this, the increase in amount of information can be compared from the perspective of performance enhancement of the system in making the correct or appropriate selection.

Figure 7:
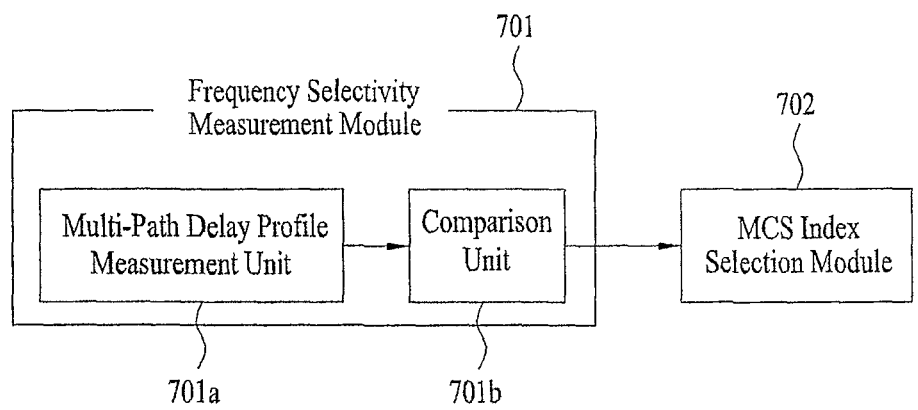
FIG. 7 is an exemplary diagram illustrating a structure of an apparatus for selecting MCS index.

FIG. 7 is an exemplary diagram illustrating a structure of an apparatus for selecting MCS index. Referring to FIG. 7, the apparatus includes a frequency selectivity measurement module 701 and a MCS index selection module 702.

More specifically, the frequency selectivity measurement module 701 can be configured to use various methods in measuring the frequency selectivity (e.g., methods associated with multi-path delay profile based on receiving channel condition, coherent bandwidth, degree of correlation between each subcarrier of the receiving channel, power correlator, and power distribution value). FIG. 7, as illustrated here, is based on the multi-path delay profile.

As such, the frequency selectivity measurement module 701 further includes a multi-path delay profile measurement unit 701a configured to measure the multi-path delay profile of the receiving channel signal, and a comparison unit 701b configured to determine whether frequency selectivity of the receiving channel is high or low by comparing the measured multi-path delay profile against the predetermined threshold value.

After the frequency selectivity measurement module 701 determines the degree or level of the frequency selectivity of the receiving channel, the MCS index selection module 702 selects a MCS index having a low coding rate if the frequency selectivity of the receiving channel is high, and conversely, the MCS index selection module 702 selects a MCS index having a high coding rate if the frequency selectivity of the receiving channel is low.

As discussed, the MCS index selection scheme (or method) can be applied to situations where only the coding rate is considered, where MCS index set is used as shown in Tables 3 and 4, and where the MCS table having high coding rate and the MCS table having low coding rate are independently configured.

The frequency selectivity measurement module 701 and the MCS index selection module 702 can be located in the receiving end. However, in view of excess processes and/or operations that may be performed by the receiving end, the frequency selectivity measurement module 701 can be located in the receiving end and the MCS index selection module 702 can be located in the transmitting end so as to alleviate (or reduce) excess processes. To this end, the receiving end (e.g., mobile terminal) needs to send feedback information, including information regarding the measured frequency selectivity, to the transmitting end.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of communicating by a user equipment in a wireless communication system, the method comprising:
    transmitting, by the UE to a base station, information related to a channel quality; and
    receiving, by the UE from the base station, an MCS index selected by the base station from a single MCS table based on the transmitted information related to a channel quality and according to a predetermined rule,
    wherein the predetermined rule includes:
    identifying one or more MCS indexes from the single MCS table based on a modulation scheme indicated by the information related to the channel quality, and
    when the one or more MCS indexes includes at least two MCS indexes, selecting the MCS index to be transmitted to the UE from the at least two MCS indexes based on a coding rate indicated by the information related to the channel quality.

2. The method of claim 1, wherein the predetermined rule further includes:
    when the one or more MCS indexes includes a single MCS index, selecting the single MCS as the MCS index to be transmitted to the UE.

3. The method of claim 1, further comprising:
    receiving, by the UE from the base station, downlink data; and
    decoding, by the UE, the downlink data using the MCS index selected by the base station.

4. The method of claim 1, wherein the predetermined rule further includes:
    selecting the MCS index to be transmitted to the UE from the at least two MCS indexes based on the coding rate indicated by the information related to the channel quality and another parameter.

5. A method of communicating by a base station in a wireless communication system, the method comprising:
    receiving, by the base station from a user equipment (UE), information related to a channel quality; and
    transmitting, by the base station to the UE, an MCS index selected by the base station from a single MCS table based on the transmitted information related to a channel quality and according to a predetermined rule,
    wherein the predetermined rule includes:
    identifying one or more MCS indexes from the single MCS table based on a modulation scheme indicated by the information related to the channel quality, and
    when the one or more MCS indexes includes at least two MCS indexes, selecting the MCS index to be transmitted to the UE from the at least two MCS indexes based on a coding rate indicated by the information related to the channel quality.

6. The method of claim 5, wherein the predetermined rule further includes:
    when the one or more MCS indexes includes a single MCS index, selecting the single MCS as the MCS index to be transmitted to the UE.

7. The method of claim 5, further comprising:
    encoding, by the base station, downlink data using the selected MCS index; and
    transmitting, by the base station to the UE, the encoded downlink data.

8. The method of claim 5, wherein the predetermined rule further includes:
    selecting the MCS index to be transmitted to the UE from the at least two MCS indexes based on the coding rate indicated by the information related to the channel quality and another parameter.

9. A method of communicating in a wireless communication system, the method comprising:
    transmitting, by a user equipment (UE) to a base station, information related to a channel quality;
    selecting, by the base station, an MCS index from a single MCS table based on the transmitted information related to a channel quality and according to a predetermined rule;
    encoding, by the base station, downlink data using the selected MCS index;
    transmitting, by the base station to the UE, the encoded downlink data and the selected MCS index;
    receiving, by the UE from the base station, the selected MCS index and the encoded data; and
    decoding, by the UE, the received downlink data with the received MCS index,
    wherein the predetermined rule includes:
    identifying one or more MCS indexes from the single MCS table based on a modulation scheme indicated by the information related to the channel quality, and
    when the one or more MCS indexes includes at least two MCS indexes, selecting the MCS index to be transmitted to the UE from the at least two MCS indexes based on a coding rate indicated by the information related to the channel quality and another parameter.

10. A user equipment (UE) configured to communicate in a wireless communication system, the UE comprising:
    a transmitter;
    a receiver; and
    a processor operatively connected to the transmitter and the receiver, the processor configured to
    transmit, to a base station, information related to a channel quality, and
    receive, from the base station, an MCS index selected by the base station from a single MCS table based on the transmitted information related to a channel quality and according to a predetermined rule,
    wherein the predetermined rule includes:
    identifying one or more MCS indexes from the single MCS table based on a modulation scheme indicated by the information related to the channel quality, and
    when the one or more MCS indexes includes at least two MCS indexes, selecting the MCS index to be transmitted to the UE from the at least two MCS indexes based on a coding rate indicated by the information related to the channel quality.

11. The UE of claim 10, wherein the predetermined rule further includes:
    when the one or more MCS indexes includes a single MCS index, selecting the single MCS as the MCS index to be transmitted to the UE.

12. The UE of claim 10, wherein the processor is further configured to:
  receive downlink data from the base station, and
  decode the downlink data using the MCS index selected by the base station.

13. The UE of claim 10, wherein the predetermined rule further includes:
  selecting the MCS index to be transmitted to the UE from the at least two MCS indexes based on the coding rate indicated by the information related to the channel quality and another parameter.

14. A base station configured to communicate with a user equipment (UE) in a wireless communication system, the base station comprising:
  a transmitter;
  a receiver; and
  a processor operatively connected to the transmitter and the receiver, the processor configured to
    receive, from the UE, information related to a channel quality, and
    transmit, to the UE, an MCS index selected by the base station from a single MCS table based on the transmitted information related to a channel quality and according to a predetermined rule,
  wherein the predetermined rule includes:
    identifying one or more MCS indexes from the single MCS table based on a modulation scheme indicated by the information related to the channel quality; and
    when the one or more MCS indexes includes at least two MCS indexes, selecting the MCS index to be transmitted to the UE from the at least two MCS indexes based on a coding rate indicated by the information related to the channel quality.

15. The base station of claim 14, wherein the predetermined rule further includes:
  when the one or more MCS indexes includes a single MCS index, selecting the single MCS as the MCS index to be transmitted to the UE.

16. The base station of claim 14, wherein the processor is further configured to:
  encode downlink data using the selected MCS index, and
  transmit the encoded downlink data to the UE.

17. The base station of claim 14, wherein the predetermined rule further includes:
  selecting the MCS index to be transmitted to the UE from the at least two MCS indexes based on the coding rate indicated by the information related to the channel quality and another parameter.

* * * * *